Aug. 22, 1950     T. W. HALLERBERG     2,519,368
ELECTRIC INDICATOR
Filed March 13, 1947
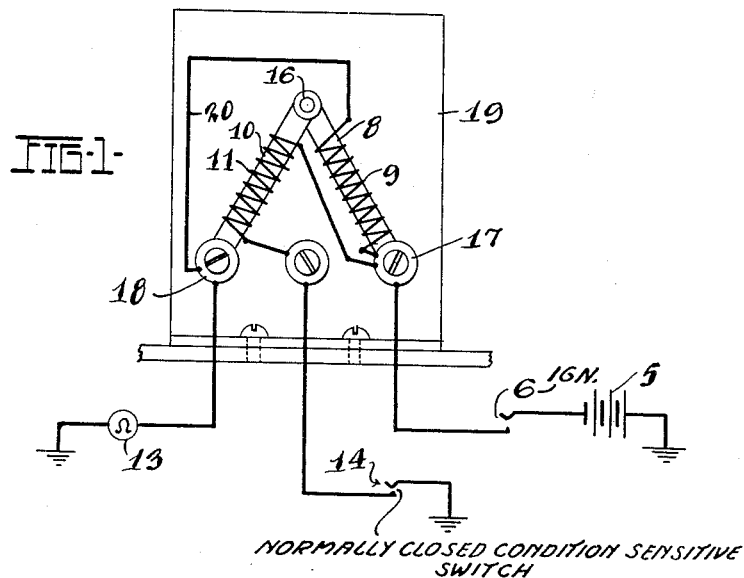
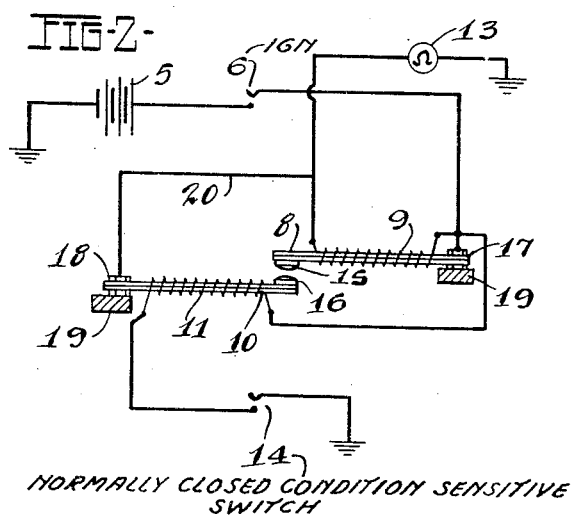
INVENTOR.
THEODORE W. HALLERBERG
BY
Owen & Owen
ATTYS.

Patented Aug. 22, 1950

2,519,368

UNITED STATES PATENT OFFICE 2,519,368

ELECTRIC INDICATOR

Theodore W. Hallerberg, Chicago, Ill.

Application March 13, 1947, Serial No. 734,294

4 Claims. (Cl. 177—311)

This invention relates to an electric indicating system suitable for use in connection with various components of an automotive vehicle or the like and has for its primary object to provide apparatus which will display one indication when the associated component is operating normally, another indication when the component is operating abnormally and a third when the indicator itself is inoperative.

In my prior Patent Number 2,053,826, issued September 8, 1936, there is disclosed an electrically operated indicating system adapted for use with automotive vehicle components in which a plurality of separate parallel sub-circuits are provided, each containing a signal moving solenoid and a condition responsive switch. Each solenoid moves a light filter to change the color and intensity of the visible rays from an indicating lamp so that, when all units are functioning properly a subdued green light is presented to the operator, while interruption of one of the parallel sub-circuits causes a color filter to move to such a position that a bright red light is visible. By divorcing the component-sensitive circuits from the circuit of the indicating lamp the entire device can be kept under constant check by the operator since failure to give an indication means simply that the indicating lamp itself has ceased to function.

It has been proposed to provide some means to call the operator's attention to the indicator light more forcibly by flashing the light from bright to dim upon the occurrence of a change in an indicating circuit. Such devices, however, have been added elements in the circuit playing no part in the normal functioning thereof.

It is an important object of the present invention to provide an indicator circuit and flashing operator in which all parts are actively functioning at all times and which can be constructed at less cost than known units.

Another object of the invention is to provide an operator for an indicating lamp which is simple and efficient in operation and easy and inexpensive to manufacture.

Still another object of the invention is to provide an operator for an indicating lamp including at least one thermally deformed element carrying one of a pair of normally open contacts, the other contact of the pair being held against closing either by a second thermally deformed unit or by some other device in a circuit in parallel with the heater for the first element.

Other objects and advantages of the invention will become apparent from the following specification, reference being had to the accompanying drawings in which:

Figure 1 is a plan view, partly diagrammatic, of an operator constructed in accordance with the present invention, together with an indicator circuit; and Fig. 2 is a circuit diagram, with the thermally deformable elements shown in side elevation.

Referring to the drawings and particularly to Figs. 1 and 2, an indicator system having an operator according to the present invention includes a source of energy such as a battery 5 to which is connected a main control switch 6 such as the ignition switch of an automobile. In the form shown, two bimetallic units 8 and 10 are provided which are more particularly described hereinafter. Each bimetallic unit is provided with a heating coil 9 and 11 wound therearound and electrically insulated therefrom. Coil 9 is connected to the control switch 6 and to one side of an indicator lamp or similar device 13, the other side of the indicator device being returned to ground.

Heater coil 11 is connected in parallel with coil 9 and in series in the same circuit is a condition sensitive switch 14, one side of which is connected to the heater coil 11 and the other side to ground.

Condition sensitive switch 14 may be any suitable device which is normally closed but which opens whenever the component with which it is associated is not operating properly. Thus, if the switch is associated with an automobile engine oil pump and the oil pressure falls below a predetermined safe value, switch 14 is arranged to open. Similarly, known thermostatically operated switches may be associated with the cooling water of an engine to be closed during normal operation and opened when the water temperature exceeds a predetermined safe limit. Such devices are described in my prior patent mentioned above and other suitable forms are known in the art.

Each of the bimetallic elements 8 and 10 is, of course, electrically conductive so that contacts 15 and 16 fixed to the free ends thereof may be utilized to open and close an electric circuit. The bimetallic units are mounted on posts or supports 17 and 18 fixed in turn to an insulating body 19 in any suitable manner. The bimetallic elements are arranged to flex in the same direction with respect to the body 19 and the free ends are normally out of contact. Since the units are of identical, or substantially identical characteristics the same voltage drop across each heating coil 9 and 11 will produce substantially the same deflection in each bimetallic unit. Thus if the voltage drop across coil 9 is equal to or less than the voltage drop across coil 11, the deflection of bimetallic unit 10 will be equal to or greater than the deflection of bimetallic unit 8 and any circuit associated with contacts 15 and 16 will remain open.

Contacts 15 and 16 are arranged to modify the circuit of indicator lamp 13, preferably by reducing the resistance in series with the lamp causing it to glow brighter whenever the contacts are closed. The reduction in resistance conveniently may be made by short circuiting the heater coil 9 since this coil will then tend to cool and contacts 15 and 16 then act as part of a flasher circuit for the indicator lamp. Since the bimetallic elements are conductive the short circuit may be established from post 17, through unit 8, contacts 15 and 16, unit 10, post 18 and a conductor 20 connected to the remote end of coil 9.

In operation, when main switch 6 is open the bimetallic units stand in an undeformed position since there is no current flow from battery 5. In such position contacts 15 and 16 are open. When the main switch 6 is closed and if the condition sensitive switch 14 is closed current flows through parallel circuits including, on one hand, coil 9 and lamp 13 to ground and on the other hand coil 11 and switch 14 to ground. The resistance of the lamp is at least equal to that of the switch so that heater coil 9 produces no more deflection or deformation of its associated bimetallic unit 8 than does heater coil 11. Thus contacts 15 and 16 will remain open since the deflection of the bimetallic units is in the same direction. Lamp 13 glows dimly under these conditions since the resistance represented by coil 9 is in series with it and the voltage available for illumination is thus reduced. However, should condition sensitive switch 14 be opened the circuit through heater coil 11 is broken allowing this coil to cool and bimetallic unit 10 to straighten. The straightened condition of this unit brings contact 15 and 16 together thus short-circuiting heater coil 9 and placing the full battery voltage across lamp 13. The lamp thus suddenly increases in brilliance.

If coil 9 is short-circuited it, too, tends to cool and permit bimetallic unit 8 to straighten thus again opening contacts 15 and 16 and reinserting the resistance of coil 9 in series with the lamp. Coil 9 thus alternately heats and cools and causes lamp 13 to glow first dimly and then brightly in repeated cycles. The duration of the cycle is somewhat irregular due to the contact potential of contacts 15 and 16 so that a flashing signal of considerable brilliance and some irregularity calls the attention of the operator of the vehicle forcibly to the fact that switch 14 is open and that the condition which should normally keep this switch closed is abnormal.

It will be seen that in practice the bimetallic units may be made substantially identical and lend themselves to rapid production and inexpensive manufacture. The circuit elements represented are not apt to get out of order because of their simplicity and an inexpensive, reliable operator thus results.

While the invention has been described in connection with two specific forms it should be appreciated that numerous modifications and changes may be made without departing from the spirit of the invention as defined in the appended claims.

What I claim is:

1. In an electric indicator, a power source, a condition sensitive circuit closer, an indicating device, means to establish parallel circuits from said power source through said condition sensitive circuit closer and through said indicating device, heating coils in each of said parallel circuits, thermally deformable metal members associated with each of said heating coils and with each other, contacts carried by said members, and connections established through said members and said contacts to short circuit that heating coil in circuit with said indicating device when that circuit alone is closed, said connections being open circuited whenever both heating coils are inactive or both active.

2. In an electric indicator, a power source, a condition sensitive circuit closer, an indicating device, means to establish parallel circuits from said power source through said condition sensitive circuit closer and through said indicating device, a heating coil in each of said parallel circuits, thermally deformable metal members associated with said heating coils, a contact carried by one of said members, a second contact carried by the other of said members, and maintained out of connection with said first contact when said condition sensitive circuit closer is in normal position, and means to establish a connection between said contacts when both of said heating coils are energized and said circuit closer is out of normal position, said connection operating to short circuit one of said heating coils and decrease the resistance in circuit with said indicating device.

3. In an electric indicator, a power source, an indicating device, opposed bimetallic elements having heating coils therearound, one of said heating coils being normally in series with said power source and said indicating device, the other of said heating coils being disposed in a parallel circuit the condition of which is to be indicated, means in said parallel circuit to energize said heating coil when conditions are normal and to interrupt energization when conditions are abnormal, and contacts carried by said bimetallic elements and controlling a parallel circuit to said indicating device shunting said series heating coil, said contacts being open when both bimetallic elements are heated or cooled and closed when only a selected one of said bimetallic elements is heated.

4. In an electric indicator, a power source, an indicating device, a first bimetallic element having a first heating coil therearound, said heating coil being normally in series with said power source and said indicating device, a contact carried by said bimetallic element, a cooperating contact engageable with said first contact and adapted when closed therewith to shunt said first heating coil, a second bimetallic element carrying said cooperating contact, a second circuit the condition of which is to be indicated, and heating means operated by said second circuit to deform said second bimetallic element to prevent engagement of said contacts when conditions in said second circuit are normal and to initiate contact engagement when conditions are abnormal.

THEODORE W. HALLERBERG.

REFERENCES CITED

The following references are of record in the file of this patent:

UNITED STATES PATENTS

| Number | Name | Date |
| --- | --- | --- |
| 1,965,176 | Eveland | July 3, 1934 |
| 2,165,569 | Obermaier | July 11, 1939 |
| 2,362,021 | Nazar | Nov. 7, 1944 |
| 2,377,569 | Morse | June 5, 1945 |
| 2,402,312 | Burch | June 18, 1946 |
| 2,431,241 | Godsey, Jr. | Nov. 18, 1947 |
| 2,450,450 | Schmidinger | Oct. 5, 1948 |